United States Patent
Karp et al.

(10) Patent No.: US 7,757,237 B2
(45) Date of Patent: Jul. 13, 2010

(54) SYNCHRONIZATION OF THREADS IN A MULTITHREADED COMPUTER PROGRAM

(75) Inventors: Alan H. Karp, Palo Alto, CA (US); Jean-Francois C. Collard, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1792 days.

(21) Appl. No.: 10/870,721

(22) Filed: Jun. 16, 2004

(65) Prior Publication Data

US 2005/0283780 A1 Dec. 22, 2005

(51) Int. Cl.
*G06F 9/46* (2006.01)
*G06F 9/44* (2006.01)

(52) U.S. Cl. .................................... 718/108; 712/235

(58) Field of Classification Search ................ 718/104, 718/108; 712/235
See application file for complete search history.

(56) References Cited

U.S. PATENT DOCUMENTS

| | | | |
|---|---|---|---|
| 5,224,100 A | 6/1993 | Lee et al. | |
| 5,822,588 A | 10/1998 | Sterling et al. | |
| 6,009,269 A | 12/1999 | Burrows et al. | |
| 6,094,713 A | 7/2000 | Khadder et al. | |
| 6,286,130 B1 | 9/2001 | Poulsen et al. | |
| 6,343,371 B1 | 1/2002 | Flanagan et al. | |
| 6,378,124 B1 | 4/2002 | Bates et al. | |
| 6,405,326 B1 | 6/2002 | Azagury et al. | |
| 6,457,100 B1 | 9/2002 | Ignatowski et al. | |
| 6,578,094 B1 | 6/2003 | Moudgill | |
| 6,587,967 B1 | 7/2003 | Bates et al. | |
| 6,631,460 B1 | 10/2003 | Morris et al. | |
| 6,636,949 B2 | 10/2003 | Barroso et al. | |
| 6,681,317 B1 | 1/2004 | Mathews | |
| 6,728,867 B1 | 4/2004 | Kling | |
| 7,185,338 B2 * | 2/2007 | Chamdani et al. | 718/102 |
| 7,200,717 B2 * | 4/2007 | Guthrie et al. | 711/125 |
| 2002/0129306 A1 | 9/2002 | Flanagan et al. | |
| 2003/0131283 A1 | 7/2003 | Ur et al. | |
| 2003/0135722 A1 * | 7/2003 | Johnson | 712/235 |

OTHER PUBLICATIONS

Stefan Savage, Eraser: A Dynamic Data Race Detector for Muilti-threaded program, ACM Transacstions on Computer System, vol. 15, No. 4, Nov. 1997, pp. 391-411.*

Christiaens, M., Dynamic techniques for the optimization of data race detection, In: Program Acceleration through Application and Architecture driven Code Transformations: Symposium Proceedings, pp. 73-75, Sep. 2002.

* cited by examiner

*Primary Examiner*—Meng-Ai An
*Assistant Examiner*—Camquy Truong (57) ABSTRACT

In one aspect, a data race condition is detected based on an address of a variable shared by at least first and second threads for executing the program code, the shared variable address being stored in a hardware table. Detection of the data race condition in the program code is reported. In another aspect, at least first and second threads for executing the program code are synchronized based on an address of a variable shared by the threads and stored in a hardware table.

38 Claims, 5 Drawing Sheets

SYNCHRONIZATION OF THREADS IN A MULTITHREADED COMPUTER PROGRAM

BACKGROUND

Many modern operating systems support the use of multithreaded programs, which consist of one or more threads of control that share a common address space and program resources. In multithreaded programs a shared addressable resource, such as a global variable, can be accessed by multiple threads. As a result, the threads of a multithreaded program should be synchronized in order to permit the threads to read from or write to the shared addressable resources without causing a data race. A data race occurs when two or more threads concurrently access a shared variable (memory location) without synchronization and at least one of these accesses is for storing to the shard variable. When a data race condition exists, the value of the shared variable at a particular time in the execution of a thread depends on the order in which the threads accessing the shared variable are executed. Detecting data race conditions is difficult because they are non-deterministic and they may occur as a result of unrelated sections of code accessing the shared variable.

Race conditions may be avoided by incorporating various mechanisms for ensuring that each thread has mutually exclusive access to a shared resource. In one approach, a shared resource is protected by requiring threads to obtain a designated mutually exclusive lock before the shared resource can be modified. Threads without the lock must wait until the current thread releases the lock. Race-free program code may be achieved be guaranteed by diligent use of such mutual exclusion locking mechanisms since at each instance only one thread can hold the lock for a particular shared variable.

Various program analysis tools (e.g., debuggers) have been proposed for detecting race conditions. Some program analysis tools are configured to detect data races dynamically during execution of the program code. Dynamic data race detection tools use tracing mechanisms to determine whether a data race occurred during a particular execution of a program. In general, dynamic data race detection methods impose a high overhead on program execution. Other program analysis tools are configured to detect data race conditions statically by, for example, tracing the execution of every path through the program code. Static race detection tools perform a compile-time analysis of a program's source code. In general, static race detection methods tend to generate a significant number of false alarms, making the detection of actual race conditions difficult for programmers.

To summarize, prior approaches for detecting data races impose large performance penalties or are prone to produce erroneous results. What is needed are systems and methods for detecting data race conditions in multithreaded programs in ways that do not impose substantial processing overhead and are significantly less prone to error.

SUMMARY

In one aspect, the invention features a machine-implemented method of processing program code in accordance with which a data race condition is detected based on an address of a variable shared by at least first and second threads for executing the program code, the shared variable address being stored in a hardware table. Detection of the data race condition in the program code is reported.

In another aspect, the invention features a machine-implemented method of processing program code in accordance with which at least first and second threads for executing the program code are synchronized based on an address of a variable shared by the threads and stored in a hardware table.

The invention also features machines and machine-readable media storing machine-readable instructions for implementing each the inventive program code processing methods described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The thread synchronization embodiments described in detail below leverage the data speculation hardware functionality present in modern computer processor designs to facilitate proper synchronization of threads by detecting data race conditions in program code and to synchronize threads in multithreaded computer program code. In this way, these thread synchronization embodiments avoid the performance penalties associated with prior software-based race detection and thread synchronization schemes.

Data speculation is a process that a compiler uses to load data earlier than originally scheduled. In this way, the data required by an instruction will be available in a register when it is needed, thereby reducing or avoiding memory latency delays. Data speculation is enabled by processor instruction sets that include advanced load instructions. For example, the Intel IA-64 architecture uses an instruction called an advanced load that is executed by the processor earlier in the instruction stream than a corresponding original load instruction. In particular, the advanced load of the value at some address A may be executed before a write to potentially the same address A. When executed, an advanced load allocates an entry in a hardware structure called the advanced load address table (ALAT). The load address, the load type and the size of the load are stored in the ALAT register. A compiler typically inserts a load checking instruction at the instruction stream location of the original load instruction to validate the advanced load entry in the ALAT. The load checking instruction specifies the same register number as the corresponding advanced load instruction. When executed, the load checking operation searches the ALAT for a matching entry. If the matching entry is found, the value in the destination register is valid. If no matching entry is found, for instance if the intervening write did store at address is A, the value loaded in the destination register is invalid and the required data may be reloaded from memory or some other recovery routine may be initiated depending on the type of load checking instructions is used.

Figure 1:
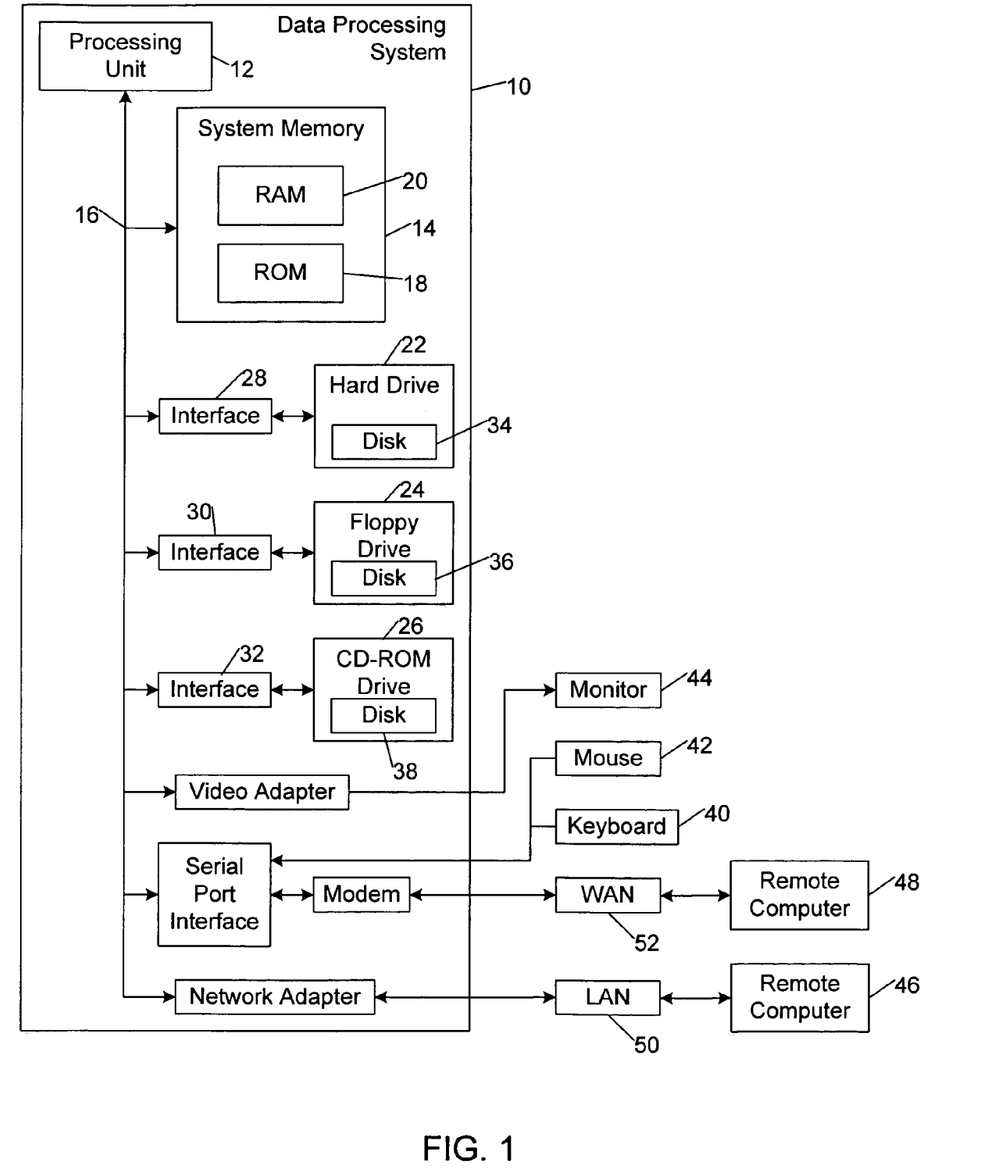
FIG. 1 is a block diagram of an embodiment of a data processing system.

FIG. 1 shows a data processing system 10 that may embody and implement one or more of the bounds checking embodiments described herein. The data processing system 10 includes a processing unit 12, a system memory 14, and a system bus 16 that couples processing unit 12 to the various components of data processing system 10. Processing unit 12 may include one or more processors, each of which may be in the form of any one of various commercially available processors that provide some form of data speculation functionality. System memory 14 includes a read only memory (ROM) 18 that stores a basic input/output system (BIOS) containing start-up routines for data processing system 10, and a random access memory (RAM) 20. System bus 16 may be a memory bus, a peripheral bus or a local bus, and may be compatible with any of a variety of bus protocols, including PCI, VESA, Microchannel, ISA, and EISA. Data processing system 10 also includes a hard drive 22, a floppy drive 24, and CD ROM drive 26 that are connected to system bus 16 by respective interfaces 28, 30, 32. Hard drive 22, floppy drive 24, and CD ROM drive 26 contain respective computer-readable media disks 34, 36, 38 that provide non-volatile or persistent storage for data, data structures and computer-executable instructions. Other computer-readable storage devices (e.g., magnetic tape drives, flash memory devices, and digital video disks) also may be used with data processing system 10. A user may interact (e.g., enter commands or data) with data processing system 10 using a keyboard 40 and a mouse 42. Other input devices (e.g., a microphone, joystick, or touch pad) also may be provided. Information may be displayed to the user on a monitor 44. Data processing system 10 also may include peripheral output devices, such as speakers and a printer. Data processing system 10 may be connected to remote computers 46, 48, which may be workstations, server computers, routers, peer devices or other common network nodes. Remote computer 46 may be connected to data processing system 10 over a local area network (LAN) 50, and remote computer 48 may be networked over a wide area network (WAN) 52 (e.g., the internet).

Figure 2:
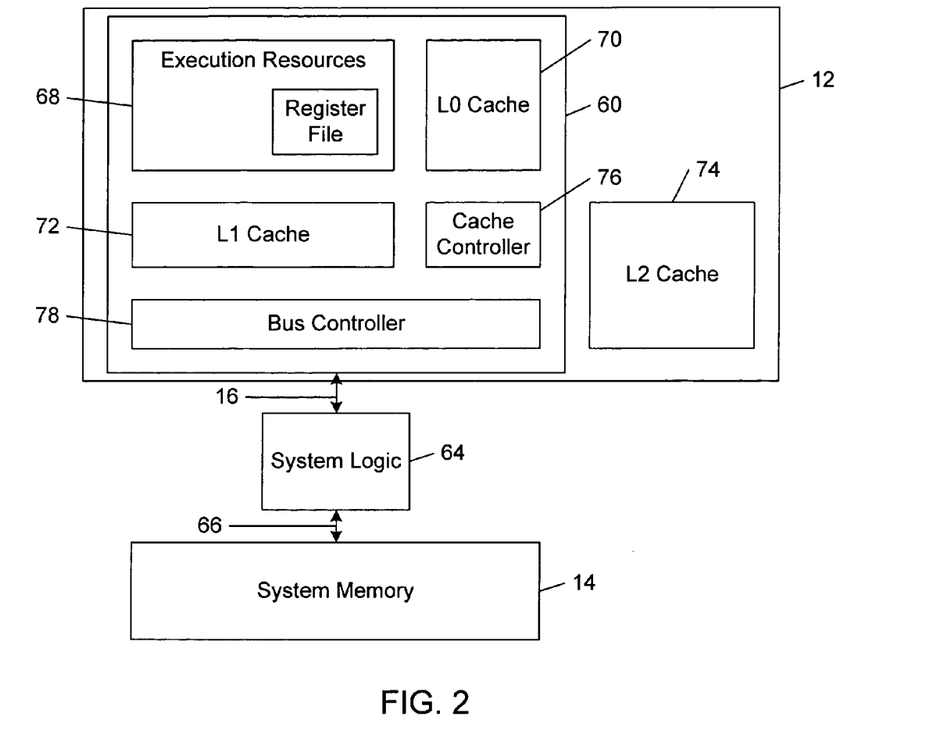
FIG. 2 is a block diagram of an embodiment of a processing unit of the data processing system shown in FIG. 1.

FIG. 2 shows an embodiment of processing unit 12 that is suitable for implementing the bounds checking embodiments described in detail below. Processing unit 12 includes a processor 60 that is connected by system bus 16 to a system logic module 64, which is connected to system memory 14 by a memory bus 66. Processing unit 12 includes a set of execution resources 68, an L0 cache 70, an L1 cache 72, an L2 cache 74, a cache controller 76, and a bus controller 78. Processor 60 may include logic elements for retrieving instructions, processing instructions, and updating the processor state. Processor 60 is operable to process advanced load instructions and advanced check instructions. Bus controller 78 manages the flow of data between processor 60 and system memory 14 and the flow of data between processor 60 and L2 cache 74, which is located on a different chip than processor 60 in the illustrated embodiment.

The execution resources 68 receives data and instructions from the various memory cache 70-74 and the system memory 14, which are arranged in a memory hierarchy with lower cache levels being closer to the processor core. Load and store operations respectively transfer data to and from register files. A load operation searches the memory hierarchy for data at a specified memory address, and returns the data to a register file, whereas a store operation writes data from a register file to one or more levels of the memory hierarchy.

Data Speculation Based Data Race Detection for Ensuring Proper Thread Synchronization The data speculation functionality of data processing system 10 may be leveraged in a program code debugger to detect data races and, thereby, ensure that the threads of a multithreaded program are synchronized properly.

Figure 3:
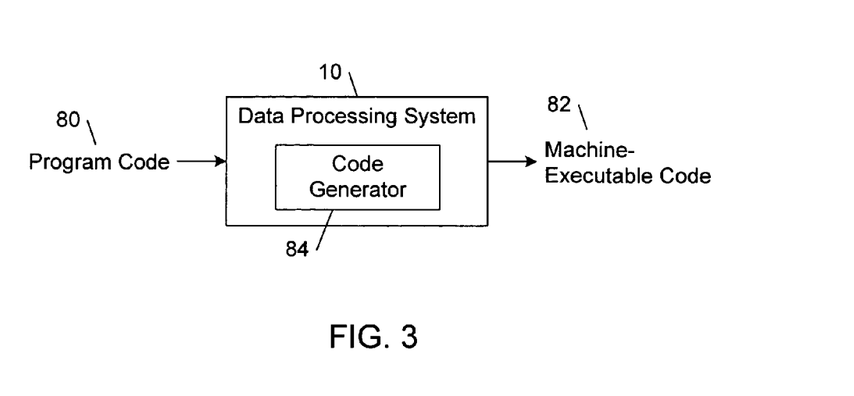
FIG. 3 shows a data pipeline that includes program code that is being processed by the data processing system embodiment of FIG. 1 into machine-executable code.

FIG. 3 shows a data pipeline by which data processing system 10 processes program code 80 into machine-executable code 82 that detects data race conditions in a way that leverages the data speculation functionality of processing unit 12. In particular, the processing system 10 executes a code generator 84 that generates machine-readable instructions corresponding to the program code 80, as well as data-speculation-based data race detection instructions, and stores the machine-readable instructions as machine-executable code 82 on a machine-readable medium (e.g., one or more of RAM 20 and disks 34-38 shown in FIG. 1). Program code 80 may correspond to a complete program, a segment of a computer program, or a stream of program instructions. In general, the code generator 84 is not limited to any particular hardware or software configuration, but rather it may be implemented in any computing or processing environment, including in digital electronic circuitry or in computer hardware, firmware, device driver, or software. In some implementations, the code generator 84 may be a compiler, a program translation system, or a suitable run-time system that transforms program code 80 into a machine-executable form (e.g., machine language).

Figure 4:
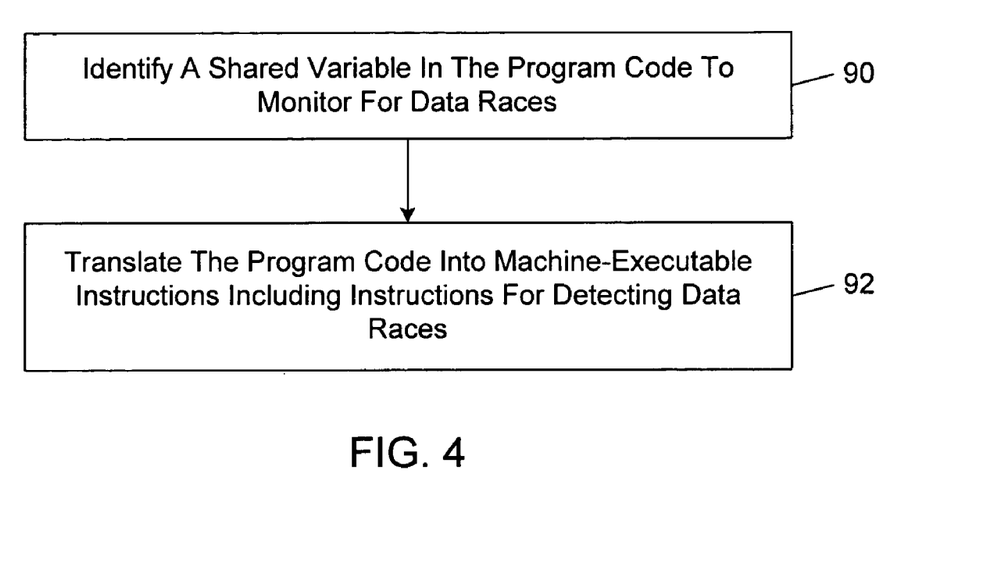
FIG. 4 is a flow diagram of an embodiment of a method of processing program code into machine-readable instructions that facilitate debugging thread synchronization errors involving data race conditions.

FIG. 4 shows an embodiment of a method by which code generator 84 processes program code 80. Code generator 84 identifies a shared variable in the program code 80 to monitor for data races (block 90). Code generator 84 may identify the shared variable based on explicit instructions contained in the program code 80. For example, code generator 84 may respond to a pragma (i.e., a compiler instruction or directive) contained in the program code 80 that specifies one or more variables that are to be monitored for data races. Alternatively, code generator 84 may be configured to automatically identify the shared variable.

After the shared variable has been identified (block 90), code generator 84 translates the program code 80 into machine-executable instructions including instructions for detecting data races (block 92). In the course of translating the program code 80, the code generator 84 typically preprocesses the program code 80. During the preprocessing stage, the code generator 84 performs tasks specified by any preprocessor statements (or directives) in the program code 80, such as reading in header files, defining constants, and evaluating expressions. After the preprocessing stage, the code generator 84 translates the program code 80 and header files into a machine-readable equivalent assembly language file (or object file). The code generator 84 then begins a linking stage, during which the object file and any associated object library files are combined into a single program object file. In addition, during the linking stage the code generator resolves external references, searches libraries, and performs other processing tasks to produce an object module that is ready for execution. The code generator 84 further processes the resulting object module to produce the machine-executable code 82, which then may be loaded into memory.

The process of incorporating machine-readable instructions for detecting data races into the translated machine-readable instructions in block 92 is illustrated with reference to the following code example:

shared int a[3];
a[0]=a[0]+a[1];
a[1]=a[1]+a[2];

Example 1

This code may be parallelized by having one thread (Thread 1) update a[0] and another thread (Thread 2) update the shared variable a[1] (i.e., Thread 1 uses the word updated by Thread 2), as follows:

| Thread 1 | Thread 2 |
|---|---|
| shared int a[3]; | shared int a[3] |
| synch( ); | synch( ) |
| a[0] = a[0] + a[1] | a[1] = a[1] + a[2] |

Example 2

This code may be compiled into the following sets of machine-readable instructions:

| Thread 1 | Thread 2 |
|---|---|
| synch( ) | synch( ) |
| ld rx = a[0] | ld rx = a[1] |
| ld ry = a[1] | ld ry = a[2] |
| add rz = rx, ry | add rz = rx, ry |
| st a[0] = rz | st a[1] = rz |

Example 3 where "synch( )" synchronizes the execution of Thread 1 and Thread 2, "ld" is a load instruction, "st" is a store instruction, and "add rz-rx,ry" is the instruction for adding the operands rx and ry. This exemplary compiled code, however, has a race condition because sometimes Thread 2 stores a[1] before Thread 1 loads it, and some other times Thread 1 loads a[1] before Thread 2 stores it.

In order to detect this race condition, code generator 84 includes in the translated machine-executable code 82 instructions for reporting the occurrence of data races during execution of the program code 80. For example, in one implementation that is compatible with a proposed extension to the Intel IA-64 architecture, code generator 84 includes instructions for detecting the store instruction involved in the data race condition of EXAMPLE 3 as follows:

| Thread 1 | Thread 2 |
|---|---|
| synch( ) | synch( ) |
| ld rx = a[0] | ld rx = a[1] |
| ld.a ry = a[1] | ld ry = a[2] |

-continued

| Thread 1 | Thread 2 |
|---|---|
| add rz = rx, ry | add rz = rx, ry |
| st a[0] = rz | chk.ar rx, error |
|  | st a[1] = rz |

Example 4

In this implementation, the machine-readable instruction "ld.a ry=a[1]" is a speculative (or advanced) load instruction that loads the memory address of a[1] into the ALAT hardware table. Any subsequent store to the shared address a[1] removes the corresponding entry from the ALAT hardware table. The machine-readable instruction "chk.ar rx, error" is an extension of the Intel iA64 architecture speculation (or advanced) load check instruction that validates the boundary memory address of a[1] stored in the ALAT hardware table. In particular, the load check instruction determines if the address contained in register rx is contained in the ALAT hardware table. The speculation check instruction tests to determine whether a store to the shared variable address contained in the hardware table has occurred. If the address is not contained in the ALAT hardware table, the code branches to the address specified by "error" to take an action, such as reporting that a data race has occurred.

In the preceding translated code of EXAMPLE 4, the shared variable address of a[1] is stored in the hardware table during the execution of Thread 1, and the shared variable address of a[1] is validated during the execution of Thread 2. In particular, if the address of a[1] is in the ALAT when Thread 2 stores a[1], then the load occurred before the store, and the result in Thread 1 is correct. If the address of a[1] is not in the ALAT when Thread 2 is ready to store the result, a data race has occurred. It is possible for the load on Thread 1 to occur between the execution of the check and store instructions on Thread 2, but the race condition will be reported correctly.

Code generator 84 includes instructions for detecting the load involved in the above-described data race as follows:

| Thread 1 | Thread 2 |
|---|---|
| ld.a r0 = a[1] |  |
| synch( ) | synch( ) |
| ld rx = a[0] | ld rx = a[1] |
| chk.a r0, error | ld ry = a[2] |
| ld ry = a[1] | add rz = rx,ry |
| add rz = rx,ry | st a[1] = rz |
| st a[0] = rz |  |

Example 5

In the preceding translated code of EXAMPLE 5, the shared variable address of a[1] is stored in the hardware table during the execution of Thread 1 before execution of Thread 1 and Thread 2 has been synchronized. The shared variable address of a[1] is validated after the execution of Thread 1 and Thread 2 has been synchronized just before Thread 1 loads a[1]. If the address of a[1] is in the ALAT before Thread 1 loads a[1], then the load occurred before the store in Thread 2, and the result in Thread 1 is correct. If the address of a[1] is not in the ALAT when Thread 1 is ready to load it, a data race has occurred.

Figure 5:
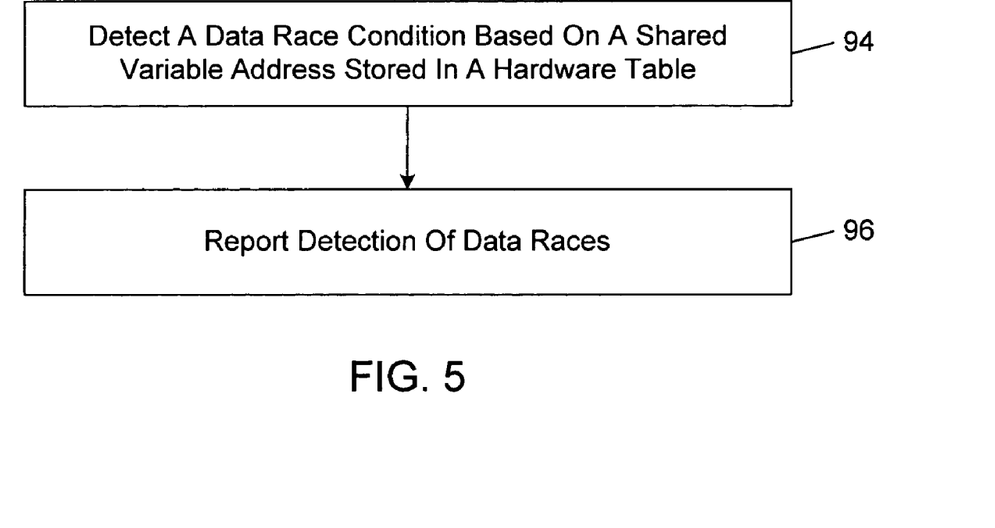
FIG. 5 is a flow diagram of an embodiment of a method of debugging thread synchronization errors in program code by detecting a data race during execution of the program code.

FIG. 5 shows an embodiment of a method of debugging thread synchronization errors in program code 80 by detecting a data race during execution of the translated machine-readable code 82. In this method, processor 60 detects a data race condition while executing the machine-readable code 82 based on a shared variable address stored in a hardware table (block 94). As explained in detail below, depending on the particular data race detection instructions that code generator 84 embedded in the machine-readable code 82, processor 60 may detect at least one of a store instruction involved in a data race and a load instruction involved in a data race. Processor 60 then reports the detection of any data races that occurred during execution of machine-readable code 82 (block 96). The report may include, among other information, an identification of at least one of a store instruction involved in a data race and a load instruction involved in a data race.

Figure 6:
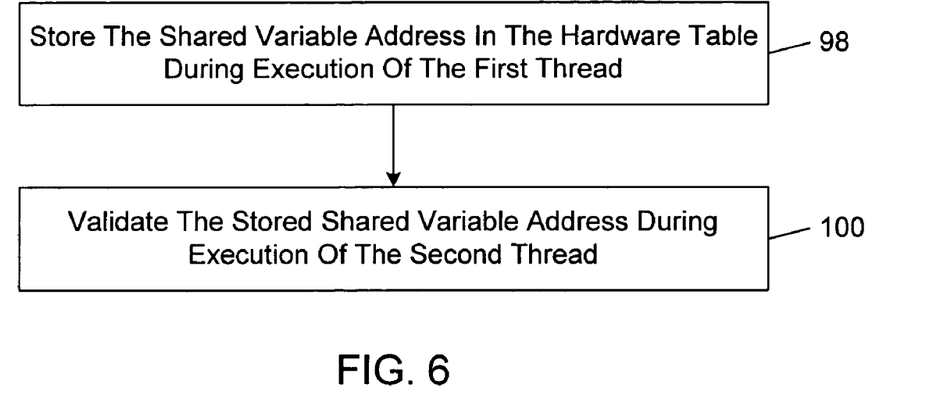
FIG. 6 is a flow diagram of an implementation of the code debugging embodiment of FIG. 5.

FIG. 6 shows an implementation of the code debugging embodiment of FIG. 5 for detecting a store instruction involved in a data race. This implementation of the debugging method is described herein with reference to the data speculation instructions contained in the translated machine-readable code of EXAMPLE 4; however, this method may be implemented by different code and in the context of any processing environment capable of data speculation. In this method, the data race condition is detected by verifying that the shared variable a[1] has been loaded by Thread 1 before the shared variable a[1] is modified by Thread 2. The processor 60 executes Thread 1 and Thread 2 of the translated machine-readable code of EXAMPLE 4. Accordingly, the processor stores the address of the shared variable a[1] in the hardware table during execution of Thread 1 (block 98). This is achieved by executing the instruction "ld.a ry=a[1]" just before the add computation event in Thread 1. Processor 60 validates the stored shared variable address during the execution of Thread 2. This is achieved by executing the instruction "chk.a rx, error" in Thread 2. As explained above, if the address of a[1] is in the ALAT when Thread 2 stores a[1], then the load occurred before the store, and the result in Thread 1 is correct. If the address of a[1] is not in the ALAT when Thread 2 is ready to store the result, a data race has occurred.

Figure 7:
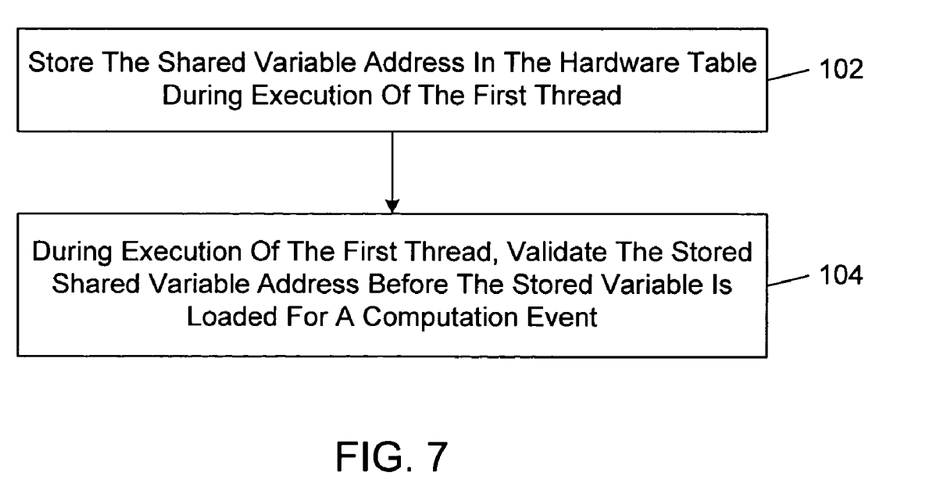
FIG. 7 is a flow diagram of an implementation of the code debugging embodiment of FIG. 5.

FIG. 7 shows an implementation of the code debugging embodiment of FIG. 5 for detecting a load instruction involved in a data race. This implementation of the debugging method is described herein with reference to the data speculation instructions contained in the translated machine-readable code of EXAMPLE 5; however, this method may be implemented in the context of any processing environment capable of data speculation. In this method, a data race is detected by verifying that the shared variable a[1] has been unmodified from a time before execution of Thread 1 and Thread 2 has been synchronized to a time when Thread 1 loads the shared variable a[1]. The processor 60 stores the address of the shared variable a[1] in the hardware table during execution of Thread 1 (block 102). This is achieved by executing the instruction "ld.a r0=a[1]" before the thread synchronization instruction "synch( )". During execution of Thread 1, the processor 60 validates the stored shared variable address before the stored variable is loaded for the add computation event. This is achieved by executing the instruction "chk.a r0, error" just before the instruction "add rz=rx,ry". As explained above, if the address of a[1] is in the ALAT before Thread 1 loads a[1], then the load occurred before the store in Thread 2, and the result in Thread 1 is correct. If the address of a[1] is not in the ALAT when Thread 1 is ready to load it, a data race has occurred.

By leveraging the data speculation functionality of data processing system 10, the above-described data race detection embodiments are able to detect data races dynamically with significantly less processing overhead than prior dynamic data race detection approaches. In addition, these data race detection embodiments are able to detect data races with greater accuracy than prior static data race detection approaches.

Data Speculation Based Thread Synchronization

The data speculation functionality of data processing system 10 may be leveraged in program code to synchronize program code threads with significantly less overhead than prior thread synchronization methods.

For example, a common way to synchronize threads is to require one thread (Thread A) to wait on a flag ("flag") before proceeding, as shown in EXAMPLE 6:

| Thread A | Thread B |
|---|---|
| int flag = 0; | int flag = 0 |
| synch( ) | synch( ) |
| while (flag = = 0) {} | flag = 1 |

Example 6

In this example, Thread A executes the "while" statement until Thread B sets the value of the "flag" variable.

In one embodiment, at least first and second threads of a program code are synchronized based on an address of a variable that is shared by the threads and is stored in a hardware table. In one implementation, the threads are synchronized by instructing the first thread to perform an advanced load of the address of a shared flag variable ("flag"), followed by an advanced load check of the flag variable address, as shown in EXAMPLE 7:

|  | Thread A | Thread B |
|---|---|---|
|  | ld.a rx = flag | synch( ) |
|  | synch( ) | st flag = r0 |
| I: | chk.a rx, II |  |
|  | branch I |  |
| II: | (rest of code) |  |

Example 7

In EXAMPLE 7, if the load check ("chk.a rx, II") succeeds, the address of the shared flag variable is still in the hardware table and the flag variable has not been updated, in which case the instructions of Thread A branch back to the load check. If the load check fails, the instructions of Thread A branch out of the program code loop to the instructions in section II of Thread A following the load check instruction and the branch I instruction in section I of Thread A.

Figure 8:
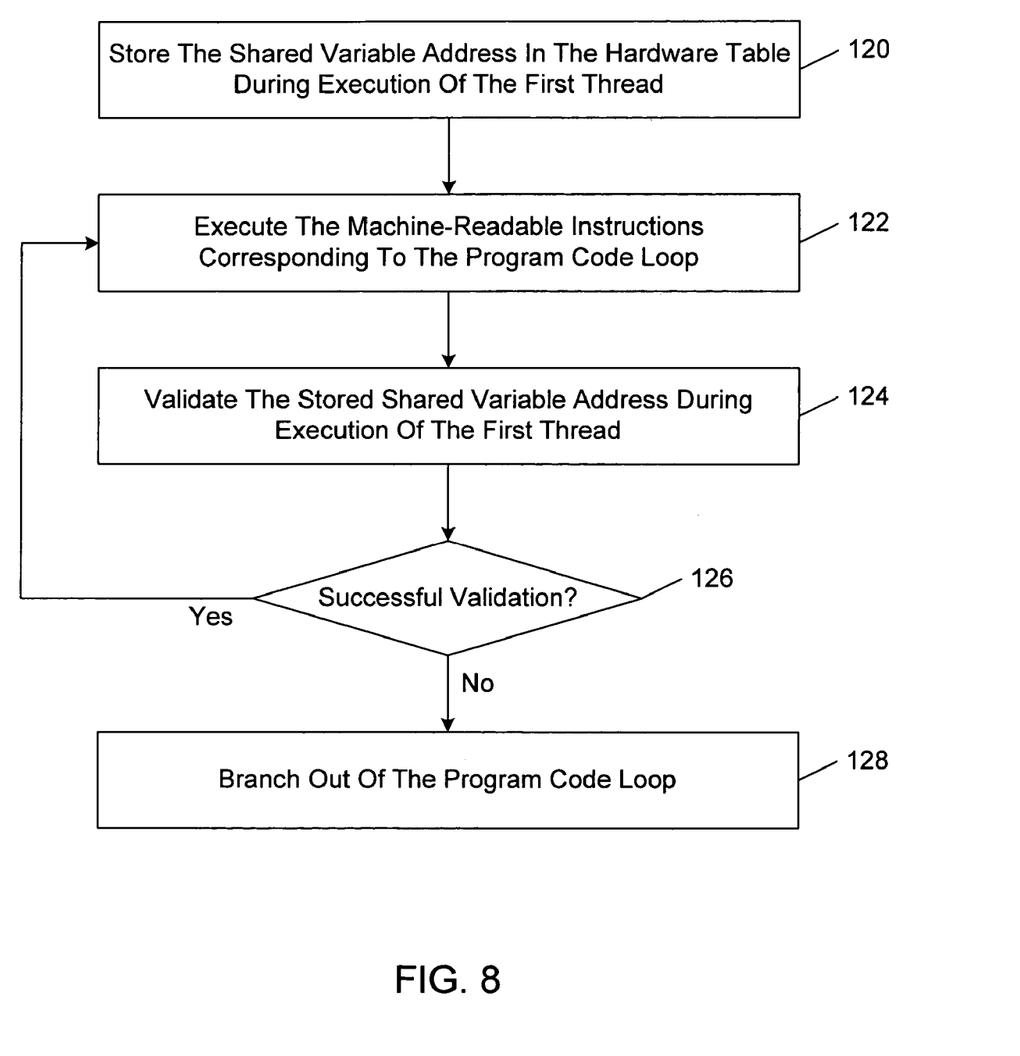
FIG. 8 is a flow diagram of an embodiment of a method of synchronizing threads in a multithreaded computer program.

FIG. 8 shows an embodiment of a method of synchronizing threads in a multithreaded computer program. This implementation of the debugging method is described herein with reference to the data speculation instructions contained in the translated machine-readable code of EXAMPLE 7; however, this method may be implemented by different program code and in the context of any processing environment capable of data speculation. In this method, the shared variable address is stored in the hardware table during execution of the first thread (block 120). This is achieved by the instruction "ld.a rx=flag" in Thread A. The machine-readable instructions corresponding to the program code loop are executed (block 122). The stored shared variable address is validated during execution of the first thread (block 124). This is achieved by the "chk.a rx, II" instruction in Thread A. If the shared variable address is in the hardware table (i.e., the load check is successful) (block 126), the "branch I" instruction causes the program code in Thread A to loop back to section I. If the shared variable address is not in the hardware table (i.e., the load check is unsuccessful) (block 126), the error target "II" causes the program code in Thread A to branch out of the program code loop of section I to the beginning of the code contained in section II (block 128).

CONCLUSION

In some current implementations of the Intel IA-64 architecture, the ALAT hardware table is not part of the state of a process and entries may be removed at any time. When used to embody or implement the thread synchronization embodiments described herein, the Intel IA-64 architecture should be modified so that use of the ALAT is deterministic. In this regard, the instruction set may be modified to include an additional bit that denotes that an entry in the ALAT is part of the process state to be saved and restored across context switches and that such an entry may not be replaced, only explicitly cleared. Also, since the value being loaded in the ld.a instruction is never used, it would be useful to have instructions to insert entries into and remove entries from the ALAT.

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A machine-implemented method of processing program code, comprising:
operating a processor so that the processor performs operations comprising
in response to each speculative load instruction in the program code, storing a load address of a variable referenced by the load instruction in a hardware table,
in response to each store instruction in the program code, comparing a store address of a variable referenced by the store instruction to addresses stored in the hardware table and removing from the hardware table any addresses that match the store address,
detecting a data race condition based on an address of a variable shared by at least first and second threads for executing the program code, wherein the detecting comprises determining that a race condition has occurred based on a failure to find the shared variable address stored in the hardware table and validating the stored shared variable address, and
reporting detection of the data race condition in the program code.

2. The method of claim 1, wherein the hardware table is designated for containing memory addresses of speculative loads.

3. The method of claim 1, wherein detecting the data race condition comprises verifying that the shared variable has been loaded by the first thread before the shared variable is modified by the second thread based on interrogation of the hardware table for the shared variable address.

4. The method of claim 1, wherein detecting the data race condition comprises verifying that the shared variable has been unmodified from a time before execution of the first and second threads has been synchronized to a time after execution of the first and second threads has been synchronized before the first thread loads the shared variable based on interrogation of the hardware table for the shared variable address.

5. The method of claim 1, wherein detecting the data race condition comprises storing the shared variable address in the hardware table.

6. The method of claim 5, wherein detecting the data race condition comprises storing the shared variable address in the hardware table during execution of the first thread and validating the stored shared variable address during execution of the second thread.

7. The method of claim 6, wherein the shared variable address is validated before a value is stored in the shared variable during execution of the second thread.

8. The method of claim 5, wherein detecting the data race condition comprises storing the shared variable address in the hardware table during execution of the first thread and validating the stored shared variable address before the shared variable is loaded for a computation event during execution of the first thread.

9. The method of claim 8, wherein the shared variable address is stored in the hardware table before execution of the first and second threads is synchronized.

10. The method of claim 1, further comprising translating program code into machine-executable instructions including machine-readable instructions for detecting the data race condition.

11. The method of claim 10, wherein the machine-readable instructions comprise instructions for verifying that the shared variable has been loaded by the first thread before the shared variable is modified by the second thread based on interrogation of the hardware table for the shared variable address.

12. The method of claim 10, wherein the machine-readable instructions comprise instructions for verifying that the shared variable has been unmodified from a time before execution of the first and second threads has been synchronized to a time after execution of the first and second threads has been synchronized before the first thread loads the shared variable based on interrogation of the hardware table for the shared variable address.

13. The method of claim 10, wherein program code is translated into machine-executable instructions including machine-readable instructions for detecting the data race condition in response to instructions in the program code prescribing synchronized access to the shared variable.

14. A machine for processing program code, comprising:
a hardware table;
a memory storing computer-readable instructions; and
a processor coupled to the hardware table and the memory, operable to execute the instructions, and based at least in part on the execution of the instructions operable to perform operations comprising
in response to each speculative load instruction in the program code, storing a load address of a variable referenced by the load instruction in the hardware table,
in response to each store instruction in the program code, comparing a store address of a variable referenced by the store instruction to addresses stored in the hardware table and removing from the hardware table any addresses that match the store address,
detecting a data race condition based on an address of a variable shared by at least first and second threads for executing the program code, wherein the detecting comprises determining that a race condition has occurred based on a failure to find the shared variable address stored in the hardware table and validating the stored shared variable address, and
reporting detection of the data race condition in the program code.

15. The machine of claim 14, wherein the hardware table is designated for containing memory addresses of speculative loads.

16. The machine of claim 14, wherein at least one data processing module is programmed to verify that the shared variable has been loaded by the first thread before the shared variable is modified by the second thread based on interrogation of the hardware table for the shared variable address.

17. The machine of claim 14, wherein at least one data processing module is programmed to verify that the shared variable has been unmodified from a time before execution of the first and second threads has been synchronized to a time after execution of the first and second threads has been synchronized before the first thread loads the shared variable based on interrogation of the hardware table for the shared variable address.

18. The machine of claim 14, wherein at least one data processing module is programmed to store the shared variable address in the hardware table.

19. The machine of claim 14, wherein at least one data processing module is programmed to translate program code into machine-executable instructions including machine-readable instructions for detecting the data race condition.

20. The machine of claim 19, wherein the machine-readable instructions comprise instructions for verifying that the shared variable has been loaded by the first thread before the shared variable is modified by the second thread based on interrogation of the hardware table for the shared variable address.

21. The machine of claim 19, wherein the machine-readable instructions comprise instructions for verifying that the shared variable has been unmodified from a time before execution of the first and second threads has been synchronized to a time after execution of the first and second threads has been synchronized before the first thread loads the shared variable based on interrogation of the hardware table for the shared variable address.

22. The machine of claim 19, wherein at least one data processing module is programmed to translate program code into machine-executable instructions including machine-readable instructions for detecting the data race condition in response to instructions in the program code prescribing synchronized access to the shared variable.

23. A computer-readable medium storing processor-readable instructions that, when executed by a processor, cause the processor to perform operations comprising:
in response to each speculative load instruction in the program code, storing a load address of a variable referenced by the load instruction in a hardware table;
in response to each store instruction in the program code, comparing a store address of a variable referenced by the store instruction to addresses stored in the hardware table and removing from the hardware table any addresses that match the store address;
detecting a data race condition based on an address of a variable shared by at least first and second threads for executing the program code, wherein the detecting comprises determining that a race condition has occurred based on a failure to find the shared variable address stored in the hardware table and validating the stored shared variable address; and
reporting detection of the data race condition in the program code.

24. The computer-readable medium of claim 23, wherein the hardware table is designated for containing memory addresses of speculative loads.

25. The computer-readable medium of claim 23, wherein the machine-readable instructions cause a machine to verify that the shared variable has been loaded by the first thread before the shared variable is modified by the second thread based on interrogation of the hardware table for the shared variable address.

26. The computer-readable medium of claim 23, wherein the machine-readable instructions cause a machine to verify that the shared variable has been unmodified from a time before execution of the first and second threads has been synchronized to a time after execution of the first and second threads has been synchronized before the first thread loads the shared variable based on interrogation of the hardware table for the shared variable address.

27. The computer-readable medium of claim 23, wherein the machine-readable instructions cause a machine to store the shared variable address in the hardware table.

28. A machine-implemented method of processing program code, comprising:
operating a processor so that the processor performs operations comprising
in response to each speculative load instruction in the program code, storing a load address of a variable referenced by the load instruction in a hardware table,
in response to each store instruction in the program code, comparing a store address of a variable referenced by the store instruction to addresses stored in the hardware table and removing from the hardware table any addresses that match the store address, and
synchronizing at least first and second threads for executing the program code based on an address of a variable shared by the threads and stored in the hardware table, wherein the synchronizing comprises validating the stored shared variable address during execution of the first thread.

29. The method of claim 28, wherein the hardware table is designated for containing memory addresses of speculative loads.

30. The method of claim 28, wherein synchronizing comprises storing the shared variable address in the hardware table during execution of the first thread and storing a value in the shared variable during execution of the second thread.

31. The method of claim 28, wherein synchronizing comprises continuing an execution loop in response to a successful validation of the shared variable address in the hardware table.

32. The method of claim 28, wherein synchronizing comprises branching out of an execution loop in response to a failed validation of the shared variable address in the hardware table.

33. A machine for processing program code, comprising:
   a hardware table;
   a memory storing computer-readable instructions; and
   a processor coupled to the hardware table and the memory, operable to execute the instructions, and based at least in part on the execution of the instructions operable to perform operations comprising
      in response to each speculative load instruction in the program code, storing a load address of a variable referenced by the load instruction in the hardware table,
      in response to each store instruction in the program code, comparing a store address of a variable referenced by the store instruction to addresses stored in the hardware table and removing from the hardware table any addresses that match the store address,
      synchronizing at least first and second threads for executing the program code based on an address of a variable shared by the threads and stored in the hardware table, wherein the synchronizing comprises validating the stored shared variable address during execution of the first thread.

34. The machine of claim 33, wherein the hardware table is designated for containing memory addresses of speculative loads.

35. The machine of claim 33, wherein at least one data processing module is programmed to store the shared variable address in the hardware table during execution of the first thread and storing a value in the shared variable during execution of the second thread.

36. A computer-readable medium storing processor-readable instructions that, when executed by a processor, cause the processor to perform operations comprising:
   in response to each speculative load instruction in the program code, storing a load address of a variable referenced by the load instruction in a hardware table;
   in response to each store instruction in the program code, comparing a store address of a variable referenced by the store instruction to addresses stored in the hardware table and removing from the hardware table any addresses that match the store address; and
   synchronizing at least first and second threads for executing the program code based on an address of a variable shared by the threads and stored in the hardware table, wherein the synchronizing comprises validating the stored shared variable address during execution of the first thread.

37. The computer-readable medium of claim 36, wherein the hardware table is designated for containing memory addresses of speculative loads.

38. The computer-readable medium of claim 36, wherein the machine-readable instructions cause a machine to store the shared variable address in the hardware table during execution of the first thread and storing a value in the shared variable during execution of the second thread.

* * * * *